United States Patent Office 3,259,456
Patented July 5, 1966

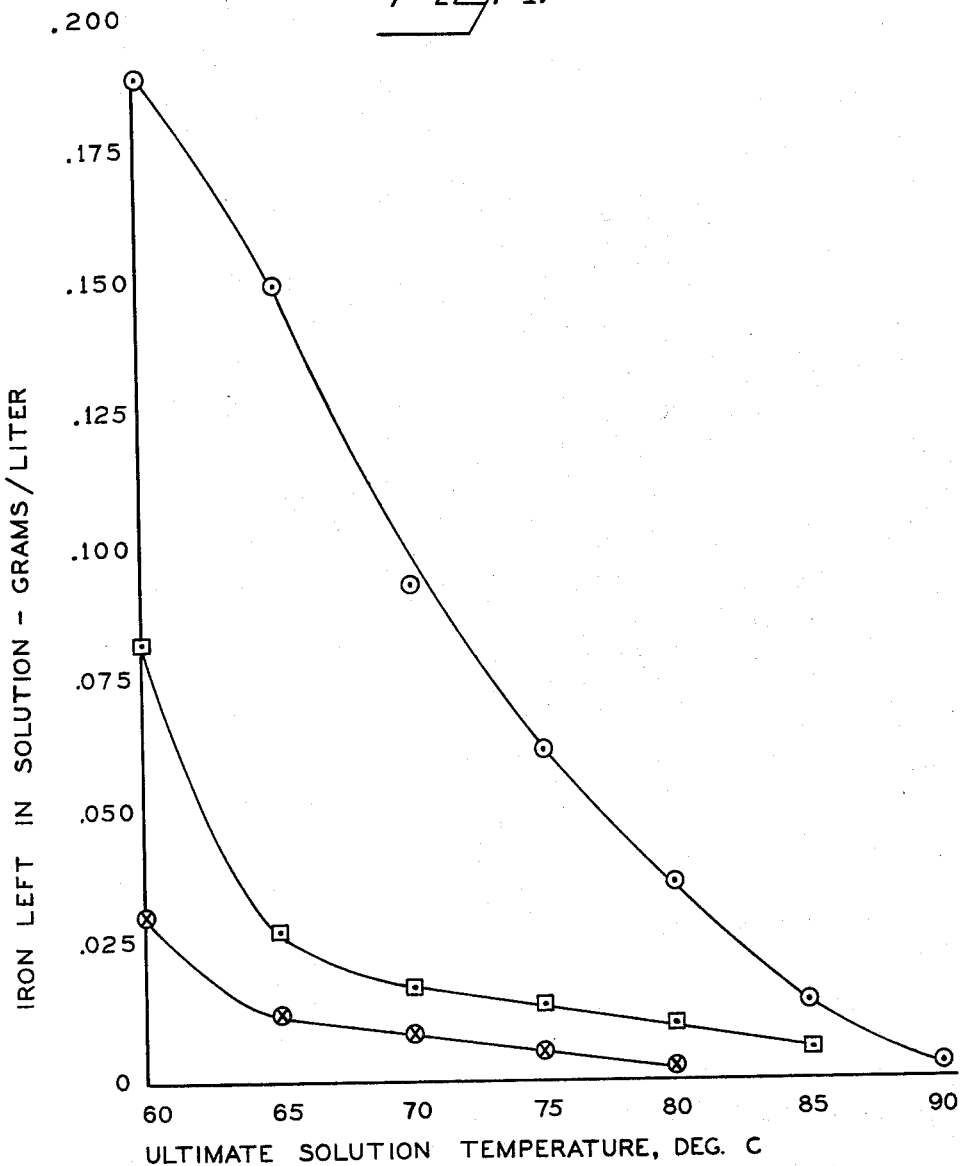

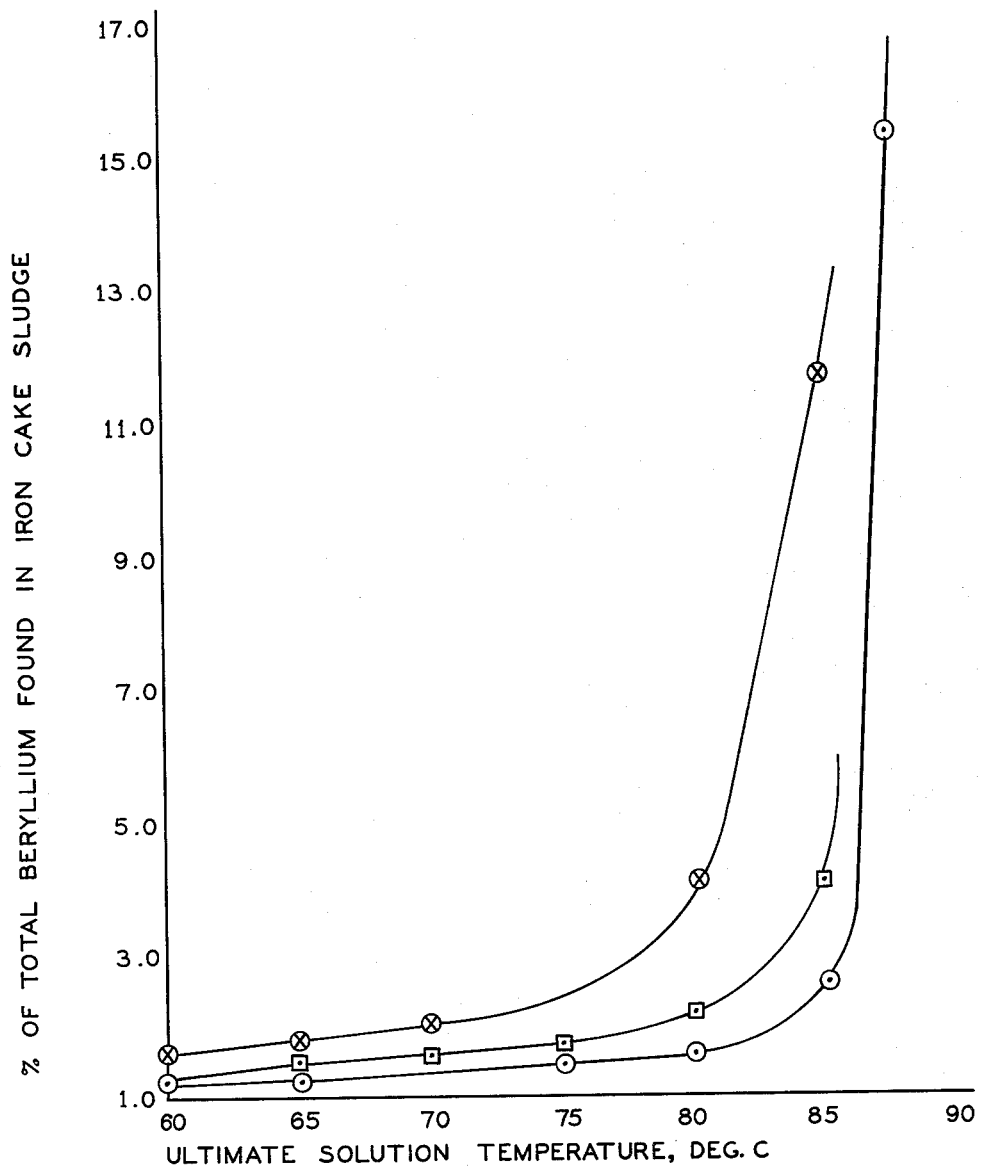

3,259,456
PROCESS FOR PRODUCING BASIC BERYLLIUM MATERIAL OF HIGH PURITY
Robert L. Maddox and Raymond A. Foos, Fremont, Ohio, assignors to The Brush Beryllium Company, Cleveland, Ohio, a corporation of Ohio
Filed Oct. 16, 1964, Ser. No. 404,376
19 Claims. (Cl. 23—88)

This invention relates to a process of producing basic beryllium material of high purity and, particularly, basic beryllium material free from metallic impurities.

The material appears to be basic beryllium carbonate, beryllium carbonate in complex form, or mixtures thereof, dependent upon the selected variations in the variable conditions of the process, but having in common the characteristic that the beryllium content is essentially free from metal impurities so that the beryllium content can readily be recovered either in the form of beryllium metal or beryllium oxide.

Because of the complexity of the material and its variability, the material is hereinafter referred to as "basic beryllium material."

Important steps of the invention relate to the recovery of the beryllium content from impure solutions of organic compounds containing beryllium and associated metal impurities, stripping of the beryllium content from the solution with ammonium carbonate to obtain the basic beryllium material, and then converting the basic beryllium material to beryllium metal and beryllium oxide, each of high purity, and capable of being sintered to provide high density, high purity bodies.

In one method employed commercially for obtaining beryllium from its ores, and frequently referred to as the sulfate process, beryllium ore is crushed, melted at about 1600° C. to about 1900° C., and quenched. The quenched material is then reacted with sulfuric acid to form beryllium sulfate solution containing impurities, primarily silica, aluminum, and iron. Upon separation of the solution from the insoluble impurities, including silica, ammonium hydroxide is added and the solution cooled to precipitate about 75% of the aluminum as ammonium alum. The precipitate is separated by filtration, chelating agents added to the filtrate to form soluble complex salts of the remaining metal impurities, and sodium is then added to precipitate crude beryllium hydroxide. Numerous time-consuming and expensive steps are required after the initial ore reaction to obtain high purity beryllium and beryllium oxide.

Research efforts have recently been directed to development of both improved methods of extracting beryllium from its ores, and improved methods of purifying the impure beryllium materials and compounds obtained during extraction procedures.

One of the most successful improved prior methods for obtaining pure beryllium is the extraction of beryllium and associated impurities from aqueous solution with various solutions of organic compounds. The aqueous solution may be obtained either by the initial process step of treating ore with an acid capable of reacting with its metal content, generally sulfuric acid, or with fusion and roasting, then leaching of the reaction mass or by other methods. The extracted impure beryllium containing material is then separated from the organic extractant and subjected to further purification steps.

While this method of extraction with organic compounds or solvents has resulted in fewer and less time-consuming purification steps, it has not proved commercially practicable as an objectionably high loss of beryllium occurs by occlusion of some beryllium in the precipitated impurities, and by incomplete separation of the impurities due to only partial precipitation. Unless specific types of organic solutions are employed under controlled conditions for extraction, in accordance with the present invention, the beryllium is not effectively and completely extracted from the reaction mass or aqueous solution. Also, an objectionable loss of the organic materials by entrainment or volatilization occurs.

The above-described disadvantages are overcome by the process of the present invention wherein the basic beryllium material is obtained by the employment of a specific type of organic solution which efficiently extracts substantially all of the basic beryllium material and a specific agent capable of stripping the beryllium content from the organic extractant, the extractant and stripping agent ultimately being recycled, and the removal of the coextracted impurities being effected by selective precipitation; the various steps of the process being carried out as hereinafter described.

An object of the invention is to provide a process for recovering beryllium content from solutions of organic compounds containing beryllium and associated metal impurities.

A further object of the invention is to provide such a process wherein the agent employed for separating basic beryllium material from the organic extractant is recycled in the process.

A still further object of the invention is to provide such a process wherein the metal impurities associated with basic beryllium material, after separation from the organic solution, are substantially removed by precipitation under controlled conditions.

Another object of the invention is to provide such a process wherein the solution of organic compounds employed for extraction is capable of extracting substantially all of the basic beryllium material from the starting material, is substantially non-volatile, and is not subject to entrainment under the controlled process conditions.

Still another object is to provide such a process for recovering from aqueous solutions containing beryllium and impurities, basic beryllium material which is capable of being calcined to form high purity beryllium oxide, capable of being sintered into high density bodies, and carbon dioxide gas which is recycled in the process.

Still another object is to provide such a process wherein the basic beryllium material is capable of being reacted with hydrofluoric acid or its acid salts to provide substantially pure beryllium fluoride, and also carbon dioxide gas and water vapor which, in combination, are recycled in the process.

The above and other objects and advantages will become apparent from the following description, wherein reference is made to the drawing, in which:

FIG. 1 is a graph showing the effects of temperatures and times in reducing the iron impurities associated with beryllium in an aqueous slurry; and FIG. 2 is a graph showing the effects of temperatures and times on the beryllium content of the iron impurity sludge of FIG. 1.

As a general example of the process of the invention, it comprises contacting an aqueous solution containing impure beryllium content with an organic extractant solution capable of extracting the beryllium content; then contacting the organic extractant solution with a sufficient quantity of ammonium carbonate to form an aqueous slurry; separating the aqueous slurry from the organic solution; then heating the slurry at a temperature ranging from about 35° C. to about 85° C. until the metal impurities associated with the beryllium content are substantially completely precipitated; filtering the slurry to separate the precipitated impurities from the beryllium content; heating the beryllium containing filtrate at a temperature ranging from about 40° C. to about 98° C. until substantially all of the beryllium content is converted to an ammoniacal precipitant or slurry of basic beryllium material with concurrent evolution of ammonia and carbon dioxide gases and water vapor; filtering this final precipitant or slurry to recover the basic beryllium material and ammoniacal solution; and, during the precipitation of the basic beryllium material from the aqueous strip phase, maintaining the pH at from about 9.0 to about 9.3 to prevent formation of other beryllium compounds and provide maximum yield of the basic beryllium material. The ammoniacal solution, the ammonia and carbon dioxide gases, and the water vapor are recycled to regenerate ammonium carbonate solution.

The impure beryllium-containing starting material may be leachings from the usual beryllium containing ores, concentrates, or slags. Preferably, the impure beryllium content is extracted from such leachings by an organic solution, such as an alkyl acid phosphate, an alkyl acid phosphate salt and mixtures thereof in a water immiscible organic solvent.

Ammonium carbonate has been found to be a very effective and economical agent for stripping the beryllium content substantially completely from the organic extractant solution, as it is capable of separating high purity beryllium content from organic solutions contaminated with other impurities. Also, because the ammonium carbonate readily dissociates upon heating to form ammonia, carbon dioxide gases, and water vapor, these products may be recycled to the initial stripping step, thereby reducing and almost eliminating the required amount of makeup ammonia and carbon dioxide. The ammonium carbonate solution should contain a minimum of about 1.5 mols per liter of ammonium carbonate for stripping the beryllium content from the organic solution, since below this concentration phase separation is incomplete.

At lower concentrations of ammonium carbonate, the impurities, particularly iron, do not separate completely from the beryllium content of the aqueous slurry during further processing procedures.

For optimum separation of the beryllium content from the metal impurities of the aqueous strip phase, the molar ratio of the ammonium carbonate to beryllium and iron combined should be a minimum of about 2.5 mols of carbonate for each mol of beryllium and iron, and a maximum of 4.0 mols of carbonate for each mol of beryllium and iron.

During the step of separation of the beryllium content from the metal impurities, the pH of the aqueous slurry should be at least 7.6 and not to exceed about 10.5. Preferably, it should be maintained from about 8.6 to about 9.3 and the temperature should be maintained at from about 35° C. to 85° C. to precipitate the impurities and retain the beryllium content in solution. Preferably, the temperature should be maintained between 50° C. and 75° C., since above 75° C. some beryllium content precipitates from the solution due to continued excessive loss of ammonia and carbonate dioxide. Below 35° C., an objectionably long time is required to decompose and precipitate the soluble iron carbonate or bicarbonates, thus making separation impractical. The decomposition of the iron carbonate salts varies from about one hour at 75° C. to about ninety-six hours at 25° C. The above temperature conditions are effective when the separation step is carried out at one atmosphere of pressure in a vented system which permits escape of evolved gases and vapors. If the separation step is performed under reduced pressures created by application of vacuum or by forced removal of gases and vapors, then shorter times, at corresponding treating temperatures and carbonate to beryllium molar ratio, are required.

After the separation of the beryllium-containing solution from the metal impurities has been effected by precipitation of the latter, the temperature is increased to from about 85° C. to about 98° C. to hydrolyze the beryllium content and form an ammoniacal slurry and precipitant of the basic beryllium material and, concurrently, to evolve ammonia and carbon dioxide gases and water vapor which are recycled to provide ammonium carbonate solution. The temperature should preferably be maintained from about 92° C. to about 95° C. to recover the maximum beryllium content. If the temperature is less than 85° C., the time required for hydrolysis of the beryllium content to form the basic beryllium material is extended to an objectional degree. If the temperature is above 98° C., progressive hydrolysis of the basic beryllium material occurs and results in the formation of a gelatinous form of beryllium hydroxide which is difficult to wash and filter. Because of occlusion of liquor containing trace impurities by this gelatinous precipitate, the purity of the desired basic beryllium material is deleteriously affected. Holding times greater than required to precipitate the basic beryllium material may be employed to retard this progressive hydrolysis, but such procedure results in the formation of objectionable mixtures of basic beryllium material and beryllium hydroxide. These temperature conditions prevail when the hydrolysis of the solution containing the basic beryllium material and the precipitation thereof are conducted in a vented system maintained at one atmosphere of pressure which permits the escape of ammonia and carbon dioxide gases. However, when the partial pressure of these gases is reduced by the application of vacuum or a diluent gas sweep, lower temperatures ranging from about 20° C. to about 60° C. may be employed to obtain results comparable to those obtained at one atmosphere without extension of the time required for complete hydrolysis and precipitation. For example, substantially complete recovery of the basic beryllium material was effected by maintaining a solution containing impure beryllium at 46° C. under a vacuum of 25 inches of mercury for about 75 minutes. At atmospheric pressure and a temperature of about 55° C., 120 hours were required for comparable recovery of the basic beryllium material from the same solution.

The organic extractant solution may consist of alkyl acid phosphates, salts of alkyl acid phosphates, and mixtures of the phosphates and salts in a water immiscible solvent. Generally, di-alkyl phosphates, salts thereof and mixtures of said phosphates are used; and di-2-ethylhexyl phosphate, di-2-ethylhexyl ammonium phosphate, and mixtures of said phosphate and its ammonium salt in a 0.2 molar to about a 0.6 molar concentration are preferred. The water-immiscible solvent may be kerosene, toluene, benzene, xylene, fuel oil, aliphatic alcohols, ketones, and mixtures thereof. Preferably, kerosene, an aliphatic alcohol containing five or more carbon atoms, and mixtures thereof, are used. A specific preferred solvent used is a mixture of kerosene and 2-ethylhexyl alcohol in a 15:1 ratio, by volume. The concentration of the alkyl acid phosphate, its salts, and mixtures thereof in the solvent is generally from about 0.1 molar to about 0.8 molar and preferably from about 0.2 molar to about 0.6 molar.

The basic beryllium material provided by the process may be further processed to provide either high purity beryllium oxide or high purity beryllium fluoride which is capable of being processed to high purity beryllium metal by known procedures.

By calcination of the basic beryllium material, a high-purity beryllium oxide product is obtained. During the calcination, carbon dioxide gas is evolved and may be recycled to the make-up ammonium carbonate generation facilities. When the basic beryllium material is reacted with hydrofluoric acid, or its acid salts, to form beryllium fluoride, carbon dioxide gas and water vapor are produced as side products which may be recycled to provide ammonium carbonate solution.

Thus the process of the invention has the advantage of providing a high-purity basic beryllium material which may be further processed to provide either sinterable high-purity beryllium oxide or high-purity beryllium metal, each of which is capable of being sintered into high density bodies. The availability of ammonia and carbon dioxide gases and water vapor from the several processing steps provides the further advantage that very little make-up ammonium carbonate, or the ammonia and carbon dioxide gas constituents thereof, are required for maintaining the proper concentration of the initial aqueous ammonium carbonate solution.

The following is an example illustrative of a preferred embodiment of the process of the invention, reference being made therein to tables following the example.

EXAMPLE

A mixer-settler train of five extraction stages and two stripping stages was operated using countercurrent flow of phases. The organic phase consisted of 0.6 molar di-2-ethylhexyl ammonium phosphate in a blend of kerosene and 2-ethylhexyl alcohol. The ratio of kerosene to alcohol used was 15:1, by volume.

The aqueous feed to the extraction stages was a filtered dilute acid solution of $BeSO_4$, $Al_2(SO_4)_3$, $Fe(SO_4)_3$, and other trace impurities resulting from the digestion, with sulfuric acid, of a heat treated, ground beryl ore. Analysis of this solution is presented in Table I, Column 1. The extraction stage operating conditions were as follows:

pH Profile (by stages 1–5) _____ 1.5, 2.0, 2.5, 3.0, 3.5.
Stage temperature _____ 35° C.
Residence time _____ 10 min./stage in both mixers and settlers.
Organic:Aqueous volumetric ratio _____ 7.4:1.
Aqueous flow rate _____ 1 liter/min.

Complete extraction of beryllium and aluminum and iron was effected with these conditions, as is indicated by analysis of raffinate in Table I, Column 1–A.

The organic phase, loaded with metallic ions, as indicated in the analysis presented in Table I, Column 2, was further settled for 30 minutes and then contacted with 3.0 molar $(NH_4)_2CO_3$ solution in two countercurrent operated mixer-settler stripping stages. The operating conditions used in the stripping stages were as follows:

pH Profile (stages 1, 2) _____ 9.2, 9.0.
Stage temperatures _____ 55° C.
Residence time _____ 10 min.
Aqueous flow rate—input _____ 2.10 liters/min.
Organic:Aqueous volumetric ratio (input) _____ 3.28:1.

Complete stripping of the organic was effected with these operating conditions with the extractant being regenerated as di-2-ethylhexyl ammonium phosphate, and recycled to the extraction stage. Analysis of the stripped organic is presented in Table I, Column 2–A.

The aqueous solution, consisting of ammonium beryllium carbonate solution containing primarily aluminum-iron precipitates (analysis presented in Table II, Column 1) was then processed as follows:

(1) An aliquote volume (1 liter) was filtered directly (Table II, Column 2) and the basic beryllium material precipitated by hydrolyzing with heat (to 94° C.). The barren mother liquor filtrate from hydrolysis contained no detectable beryllium, but minor quantities of soluble impurities plus 18 gm. $NH_3$/liter (typical analysis of filtrate shown in Table II, Column 3–A). The recovered basic beryllium material, fired at 1000° C. for two hours, was analyzed and results are presented in Table II, Column 3.

(2) A second aliquote portion was subjected to heating to 70° C. for 45 minutes, then filtering off of the sludges. This filtrate was then heated to 94° C., resulting in hydrolysis of the ammonium beryllium carbonate to precipitate totally the insoluble basic beryllium material. This recovered basic beryllium material was fired at 1000° C. for two hours. Analysis for resultant oxide is reported in Table III, Column 1.

(3) A third aliquote portion (1 liter) was subjected to heating to 80° C. for 15 minutes, then filtering off of sludges. This filtrate was subsequently heated to 94° C., the precipitated basic beryllium material was recovered by filtration and analyzed before and after calcining for two hours at 1000° C. These analyses are presented in Table III, Columns 2 and 2–A, respectively.

(4) Other aliquotes were taken and subjected to various temperature-time treatments to study their effectiveness in reducing residual iron contamination. Results of these treatments are presented in FIGURE 1, while in FIGURE 2 the corresponding beryllium content of resultant sludges associated with such treatments are presented.

From inspection of this data, it is evident that purification is dependent on time and temperature at which the strip product slurry is subjected. Merely heating the solution to various ultimate temperatures, in the absence of appreciable hold period at temperature, does not effectively remove the soluble, carbonate complexed iron without incurring excessive losses of beryllium. However, if more moderate temperature at longer time exposures are used, the iron is generally reduced well below the best level attained at the highest temperature used without an aging period, and this is attained with less than 2% of input beryllium being contained in resultant filtered sludge at temperatures below 75° C. for aging periods up to 45 minutes. Of this 2%, 70% is recovered by treatment of the sludges by repulping with dilute $H_2SO_4$ such as to the pH at 3.0, using 10 volumes of wash solution per volume of sludge. Thus, overall beryllium recovery is 99.4% whenever 10 volumes of wash water are used to make up a feed solution to extraction.

In addition to this benefit, additional benefit is derived from the nature of the precipitated iron impurity. This precipitated iron obtained from the heating and aging treatment acts as a flocculating agent for the very fine, gelatinous aluminum sludge. Such sludges of aluminum and iron normally are too fine and gelatinous to be removed completely by filtration. However, the heat-age treatment converts the iron sludge to a less gelatinous form which adheres to the more gelatinous aluminum sludge particles, effectively coating them and inducing particle agglomeration. These agglomerates are then much more readily and completely filtered from the still solubilized ammonium beryllium carbonate. Hence, the ultimate purity of the basic beryllium material is improved as shown by the presented analysis of product derived from treatment conditions described above.

In order to utilize the basic beryllium material for metal production, additional portions of aqueous strip product solution were subjected to 70° C. for 45 minutes to remove iron and aluminum substantially as shown in previous analysis, the sludges filtered off and the filtrate then hydrolyzed at 94° C. This resultant product slurry was filtered and discharged directly from the filter into a solution of HF. The free HF content was maintained at 10 gm./liter during the initial dissolving period by periodically adding increments of 70% HF. When gravity measurements indicated beryllium concentrations above 80 gm./liter, sufficient additional basic beryllium material was added to just balance with fluoride content.

A 100 ml. sample from 2.3 liters of final solution was submitted for analysis with results presented below in Table IV.

Table I

|  | Column 1 | Column 1-A | Column 2 | Column 2-A |
|---|---|---|---|---|
|  | Feed Solution to Extraction, g./l. | Raffinate Solution After Extraction g./l. | Loaded Organic After Extraction | Stripped Organic After Extraction |
| Be | 10.4 | ND | 1.53 | .02 |
| Al | 3.1 | <.05 | .38 | .009 |
| Fe | 1.5 | <.001 | .22 | .004 |
| Na | 12 | 7.8 | .003 | ND |
| Ca | 2 | 1.3 | <.001 | ND |
| $NH_3$ | 2.5 | 51.0 | 0 | 10.0 |
| $SO_4^=$, free | 23 | 0 | 1.3 | ND |
| Si | .3 | .2 | <.001 | ND |
| Ti | .01 | ND | .001 | ND |
| Mn | .015 | .01 | <.0005 | ND |
| Ni | <.01 | .005 | <.0005 | --- |
| Cr | <.01 | .005 | <.0005 | --- |
| B | <<.001 | <.0005 | <.0005 | --- |
| Cu | <<.001 | <.0005 | <.0005 | --- |
| Zn | <<.001 | <.0005 | <.0005 | --- |
| pH | .5 | 3.5 | --- | --- |
| Volume Ratio based on initial volume of Feed Solution | 1.0 | 1.52 | 6.9 | 7.4 |

Table II

|  | Column 1 | Column 2 | Column 3 | Column 3-A |
|---|---|---|---|---|
|  | Aqueous Strip Product Solution Untreated and Unfiltered g./l. | Aqueous Strip Product Solution Untreated but Filtered g./l. | BeO from Untreated but Filtered Strip Product Solution [1] (p.p.m. on BeO basis) | Barren Filtrate from Hydrolysis at 94° C. g./l. |
| Be | 6.66 | 6.59 | ([2]) | ND |
| Al | 1.96 | .04 | 1,500 | ND |
| Fe | .97 | .19 | 8,500 | <.0001 |
| Na | .03 | .03 | 800 | .014 |
| Ca | .02 | .005 | 200 | .001 |
| Si | .02 | .003 | 120 | <.0001 |
| Ti | .004 | .004 | 180 | .0001 |
| Mn | <.001 | <.001 | <5 | <.0001 |
| Ni | <.001 | <.001 | <5 | <.0001 |
| K | <.001 | <.001 | 20 | --- |
| Cr | <.001 | <.001 | <10 | <.0001 |
| Li | <.001 | <.001 | 30 | --- |
| B | <.0001 | <.0001 | <5 | <.0001 |
| Cu | <.0001 | <.0001 | 5 | <.0001 |
| Zn | <.0001 | <.0001 | 10 | <.0001 |
| pH | 8.9+ | 8.9+ | --- | 9.5 |
| $(NH_4)_2CO_3$ | ([3]) | 3.6 | --- | ([4]) |
| Percent of Total Be Contained in Filtered Sludge | --- | 1.2 | --- | --- |
| Percent of Total Be lost after recovery treatment on sludge | --- | .6 | --- | --- |
| Net Be Recovery, percent | --- | 99.4 | --- | --- |

[1] (Basic Be material fired at 1,000° C. for 2 hours.) Net Volume, 1.56 liter/liter feed.
[2] 94.3% BeO.
[3] 3.6 Molar.
[4] 18.6 gm. $NH_3$ .2 Molar in $CO_3$.

Table III

|  | Column 1 | Column 2 |
|---|---|---|
|  | Aqueous Strip Product Solution, treated by holding for 40 min. at 70° C. and then filtered. Basic beryllium material precipitated at 94° C., fired for 2 hrs. at 1,000° C. (p.p.m. on BeO basis) | Aqueous Strip Product Solution, treated by holding 15 min. at 80° C. and then filtered. Basic beryllium material precipitated by hydrolysis at 94° C., fired for 2 hrs. at 1,000° C. (p.p.m. on BeO basis) |
| BeO, percent | 99.7 | --- |
| Al | 200 | 100 |
| Cd | ND | ND |
| Cr | 3 | 3 |
| Fe | 300 | 160 |
| Li | 30 | 20 |
| Mg | 25 | 25 |
| Mn | 4 | 2 |
| Ni | 3 | 2 |
| Ti | 85 | 60 |
| Na | 750 | 720 |
| Ag | <1 | <1 |
| Ca | 80 | 40 |
| Co | <1 | <1 |
| Cu | 2 | 2 |
| Mo | <3 | <3 |
| Pb | <2 | <2 |
| Si | 60 | 40 |
| Zn | <20 | <20 |
| K | 30 | 30 |
| Net Be Recovery (after recovery treatment on sludges), percent | 99.3 | 99.2 |

Table IV

| | | | |
|---|---|---|---|
| Be content of $BeF_2$ solution, g./l. | | | 83.6 |
| $BeF_2$ solution specific gravity, °C. | | | 1.21/25 |
| $BeF_2$ solution pH (balanced) | | | 6.2 |

Impurity Analysis, p.p.m. on BeO basis—

| | | | |
|---|---|---|---|
| Al | 180 | Ag | <1 |
| Cd | ND | Ca | 40 |
| Cr | 5 | Co | <1 |
| Fe | 340 | Cu | 1 |
| Li | 15 | Mo | >3 |
| Mg | 20 | Pb | <2 |
| Mn | 3 | Si | 30 |
| Ni | 2 | Zn | <20 |
| Ti | 100 | K | 20 |
| Na | 800 | | |

Having thus described our invention, we claim:

1. A process for obtaining a basic beryllium material of high purity from an aqueous solution having beryllium content and comprising: (a) contacting the beryllium-containing solution with an organic extractant solution consisting essentially of at least one water-immiscible organic solvent and a material selected for the group consisting of alkyl acid phosphates, salts of alkyl acid phosphates, and mixtures of said phosphates and salts to extract the beryllium content and metal impurities, (b) subjecting the extractant solution, with the beryllium content and metal impurities therein, to a stripping solution of ammonium carbonate of sufficient concentration to strip the beryllium content and metal impurities from the organic extractant solution and form an aqueous slurry of the beryllium content and metal impurities, (c) heating the aqueous slurry to a temperature sufficient to precipitate the metal impurities and retain the beryllium content in the solution, and (d) heating the resultant beryllium-containing solution to a higher temperature which is sufficient to produce a slurry of the basic beryllium material of high purity with a concurrent evolution of ammonia and carbon dioxide gases therefrom.

2. The process according to claim 1 wherein the basic beryllium material of high purity is calcined to form beryllium oxide with a concurrent evolution of additional ammonia and carbon dioxide gases.

3. The process according to claim 1 wherein the basic beryllium material of high purity is reacted with a material selected from the group consisting of hydrofluoric acid, salts thereof, and mixtures of the acid and salts, to form beryllium fluoride with a concurrent evolution of additional ammonia and carbon dioxide gases.

4. The process according to claim 2 wherein the ammonia and carbon dioxide gases are converted to ammonium carbonate solution and recycled in the process.

5. The process according to claim 3 wherein the ammonia and carbon dioxide gases are converted to ammonium carbonate solution and recycled in the process.

6. The process according to claim 1 wherein the aqueous solution is a mineral acid solution.

7. The process according to claim 1 wherein the organic solvent is selected from the group consisting of kerosene, toluene, benzene, xylene, fuel oil, aliphatic alcohols, ketones, and mixtures thereof.

8. The process according to claim 1 wherein the solvent is one selected from the group consisting of kerosene, an aliphatic alcohol containing at least five carbon atoms, and mixtures thereof.

9. The process according to claim 8 wherein the alcohol is 2-diethyl hexyl alcohol.

10. The process according to claim 1 wherein the material is selected from the group consisting of di-2-ethyl hexyl phosphate, di-2-ethylhexyl ammonium phosphate, and mixtures thereof.

11. The process according to claim 1 wherein the ammonium carbonate is maintained in an amount and concentration to maintain the pH of the aqueous slurry at from about 7.6 to about 10.5.

12. The process according to claim 7 wherein the pH is maintained at from about 8.6 to about 9.3.

13. The process according to claim 1 wherein the aqueous slurry is heated to a temperature of from about 35° C. to about 85° C.

14. The process according to claim 13 wherein the aqueous slurry is heated to a temperature from about 50° C. to about 75° C.

15. The process according to claim 1 wherein the ratio of the molar concentration of the carbonate ion of the stripping solution to the combined molar concentration of the beryllium and iron ions is from about 2.5 to about 4.0.

16. The process according to claim 1 wherein the resultant beryllium-containing solution is heated to a temperature of from about 85° C. to about 98° C.

17. The process according to claim 16 wherein the resultant beryllium-containing solution is heated to a temperature of from about 92° C. to about 95° C.

18. A process according to claim 1 wherein the ammonia and carbon dioxide gases evolved during the formation of the slurry of the basic beryllium material are converted to ammonium carbonate solution and recycled in the process.

19. A process according to claim 1 wherein the precipitation of both the metal impurities and the basic beryllium material are carried out below atmospheric pressure.

References Cited by the Examiner

UNITED STATES PATENTS

| | | | |
|---|---|---|---|
| 3,145,081 | 8/1964 | Surls et al. | 23—183 |
| 3,177,068 | 4/1965 | Mod et al. | 75—101 |

OTHER REFERENCES

Chemical Engineering, October 31, 1960, pages 82–85.

OSCAR R. VERTIZ, *Primary Examiner.*

E. STERN, *Assistant Examiner.*